(12) United States Patent
Baek et al.

(10) Patent No.: US 7,894,815 B2
(45) Date of Patent: Feb. 22, 2011

(54) DEVICE FOR PROVIDING HAND-OFF QUALITY OF SERVICE OF INTER-ACCESS SYSTEMS AND METHOD THEREOF

(75) Inventors: Seung-Kwon Baek, Daejeon (KR); Bong-Ju Lee, Jeonju (KR); Jae-Su Song, Daejeon (KR); Won-Ik Kim, Seoul (KR); Ji-Soo Park, Daejeon (KR); Soo-Chang Kim, Daejeon (KR); Sung-gu Choi, Daejeon (KR); Hyung-Sub Kim, Seoul (KR); Yeon-Seung Shin, Daejeon (KR)

(73) Assignees: Electronics and Telecommunications Research Institute, Daejeon (KR); SK Telecom Co., Ltd., Seoul (KR); KT Corporation, Seongnam (KR)

( * ) Notice: Subject to any disclaimer, the term of this patent is extended or adjusted under 35 U.S.C. 154(b) by 930 days.

(21) Appl. No.: 11/544,831

(22) Filed: Oct. 5, 2006

(65) Prior Publication Data

US 2007/0115887 A1 May 24, 2007

(30) Foreign Application Priority Data

Oct. 21, 2005 (KR) .................... 10-2005-0099624
Jun. 8, 2006 (KR) .................... 10-2006-0051332

(51) Int. Cl.
*H04Q 7/20* (2006.01)
(52) U.S. Cl. .................... 455/436; 370/310; 370/328; 370/329; 370/330; 370/331
(58) Field of Classification Search ................ 370/310, 370/328–331; 455/436
See application file for complete search history.

(56) References Cited

U.S. PATENT DOCUMENTS 6,728,365 B1 * 4/2004 Li et al. .................... 370/235

(Continued)

FOREIGN PATENT DOCUMENTS

JP 11-285049 10/1999

(Continued)

OTHER PUBLICATIONS

"Additional Descriptions on Policy control and charging for SAE"; Oct. 11-14, 2005. 3GPP TSA SA WG2 Architecture-Ad-Hoc Meeting, Seattle, US.

(Continued)

*Primary Examiner*—Nghi H Ly
*Assistant Examiner*—Joseph Dean, Jr.
(74) *Attorney, Agent, or Firm*—Ladas & Parry LLP

(57) ABSTRACT

The present invention relates to a device for providing a quality of service (QoS) of a hand-off between heterogeneous networks, and a method thereof. According to the present invention, the device includes a device for performing a QoS management function for each access system and a device for performing a QoS management function between heterogeneous access systems in a network including a plurality of interlocked access systems. The device for performing the QoS management function for each access system manages a user service session, a local QoS of the access system, and a QoS context of the service session. The device for performing the QoS management function between the heterogeneous access systems negotiates the QoS of the service session and manages the QoS context when the hand-off is performed between the heterogeneous access systems, and performs a QoS mapping operation.

27 Claims, 7 Drawing Sheets

U.S. PATENT DOCUMENTS

| | | | |
|---|---|---|---|
| 6,907,243 B1* | 6/2005 | Patel | 455/442 |
| 7,664,501 B2* | 2/2010 | Dutta et al. | 455/436 |
| 7,688,785 B2* | 3/2010 | Bachmann et al. | 370/331 |
| 2001/0053126 A1* | 12/2001 | Chen | 370/229 |
| 2002/0091802 A1* | 7/2002 | Paul et al. | 709/223 |
| 2002/0102978 A1 | 8/2002 | Yahagi | |
| 2005/0076136 A1* | 4/2005 | Cho et al. | 709/231 |
| 2006/0133315 A1* | 6/2006 | Eriksson et al. | 370/331 |
| 2006/0240828 A1* | 10/2006 | Jain et al. | 455/436 |
| 2006/0276192 A1* | 12/2006 | Dutta et al. | 455/436 |

FOREIGN PATENT DOCUMENTS

| | | |
|---|---|---|
| JP | 2002-077965 | 3/2002 |
| KR | 1020050045298 | 5/2005 |
| KR | 1030050071328 | 7/2005 |
| KR | 1020060043314 | 5/2006 |
| KR | 1020060063316 | 6/2006 |

OTHER PUBLICATIONS

"Additional Descriptions on Policy Control and Charging for SAE", Oct. 11-14, 2005, ETRI.

* cited by examiner

DEVICE FOR PROVIDING HAND-OFF QUALITY OF SERVICE OF INTER-ACCESS SYSTEMS AND METHOD THEREOF

CROSS-REFERENCE TO RELATED APPLICATION

This application claims priority to and the benefit of Korean Patent Application No. 10-2005-0099624 filed on Oct. 21, 2005, and No. 10-2006-0051332 filed on Jun. 8, 2006, in the Korean Intellectual Property Office, the entire contents of which are incorporated herein by reference.

BACKGROUND OF THE INVENTION (a) Field of the Invention

The present invention relates to a device for providing a hand-off quality of service (QoS) between heterogeneous networks, and a method thereof. More particularly, the present invention relates to a system for providing a QoS on a user service in a next generation mobile communication system including a plurality of interconnected access systems.

(b) Description of the Related Art

Standards for current mobile communication systems are set and developed by a universal mobile communication system (UMTS) of the third generation partnership project (3GPP) and a code division multiple access 2000 (CDMA2000) of the 3GPP2. It is predicted that these systems will be developed into a third generation evolution system.

Various wireless communication systems including a wireless local access network (WLAN) have been developed to provide a high speed data communication service in a predetermined hot spot range, and various attempts has been made to commercially provide a digital video broadcasting system for digital broadcasting.

It is also predicted that the respective wireless communication system and mobile communication system will be developed and that a plurality of access systems will operate in cooperation with each other in the next generation mobile communication system.

In addition, requirements of services using assess systems appropriate for service characteristics will increase since a multi-mode terminal including various access functions is used.

In response to the requirements, it is required to provide a base station and network techniques for the mobile communication system.

Particularly, when a mobile terminal performs a vertical handoff between the heterogeneous access systems in the next generation mobile communication system, it is required to provide a QoS that guarantees continuity of a service session or a service call and that is appropriate for the service characteristics.

However, no method has been developed for providing the QoS according to the hand-off in the next generation mobile communication system having interconnected heterogeneous access systems.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus for providing a quality of service (QoS) that is appropriate for service characteristics and guaranteeing service sessions or call continuity when a hand-off is generated between heterogeneous access systems, and a method thereof.

An exemplary apparatus for managing a quality of service (QoS) of a hand-off operation of heterogeneous access systems according to an embodiment of the present invention includes a QoS negotiation managing unit and an access system interface unit. The QoS negotiation managing unit negotiates the QoS according to a hand-off request between the heterogeneous access systems of a terminal. The access system interface unit requests a QoS context for negotiating the QoS to a serving access system of the terminal to receive the context, and transmits QoS information negotiated by the QoS negotiation managing unit to a target access system of the terminal.

An exemplary apparatus for managing a quality of service (QoS) for each access system in cooperation with a device for managing the QoS between heterogeneous access systems according to another embodiment of the present invention includes an interface unit and a QoS controller. The interface unit performs an interface operation with the device for managing the QoS between the heterogeneous access systems, receives a request for information for negotiating a hand-off QoS, and transmits a response to the request. The QoS controller manages a service session and QoS information, interworks with the interface unit, and provides information requested by the device for managing the QoS between heterogeneous access systems.

An exemplary apparatus for providing a hand-off quality of service (QoS) between heterogeneous access systems in a network having a plurality of interworked access systems according to a further embodiment of the present invention includes a first QoS management unit and a second QoS management unit. The first QoS management unit performs a local QoS management function for each access system, and the second QoS management unit performs a QoS management function according to a hand-off between the heterogeneous access systems.

In an exemplary method for providing a hand-off quality of service (QoS) between heterogeneous networks according to an embodiment of the present invention, a) a quality of service (QoS) negotiation request for a hand-off between heterogeneous access systems is received, b) user information and access system information for negotiating a hand-off QoS is requested to a serving access system and a target access system, and the information is received, c) the QoS is negotiated by using the information received in b), and d) a QoS negotiation result is provided.

In an exemplary method for providing a quality of service (QoS) for each access system to perform a hand-off between heterogeneous access systems according to another embodiment of the present invention, a) a QoS negotiation request according to a hand-off request from a terminal is transmitted by a serving access system, b) user information according to a user information request for negotiating the QoS is transmitted, c) a hand-off response according to a QoS negotiation is received based on the information transmitted in b), and d) a service session release is performed according to the hand-off response.

In an exemplary method for managing a quality of service (QoS) for each access system to perform a hand-off between heterogeneous access systems according to a further embodiment of the present invention, a) an access system information request for negotiating a hand-off QoS is received, and access system information is provided by the target access system, b) a hand-off QoS negotiation result is received, and a preliminary operation of the hand-off is performed, and c) a service session is connected by using the hand-off QoS negotiation result, and a service provided from a serving access system is provided by the terminal.

DETAILED DESCRIPTION OF THE EMBODIMENTS

Figure 1:
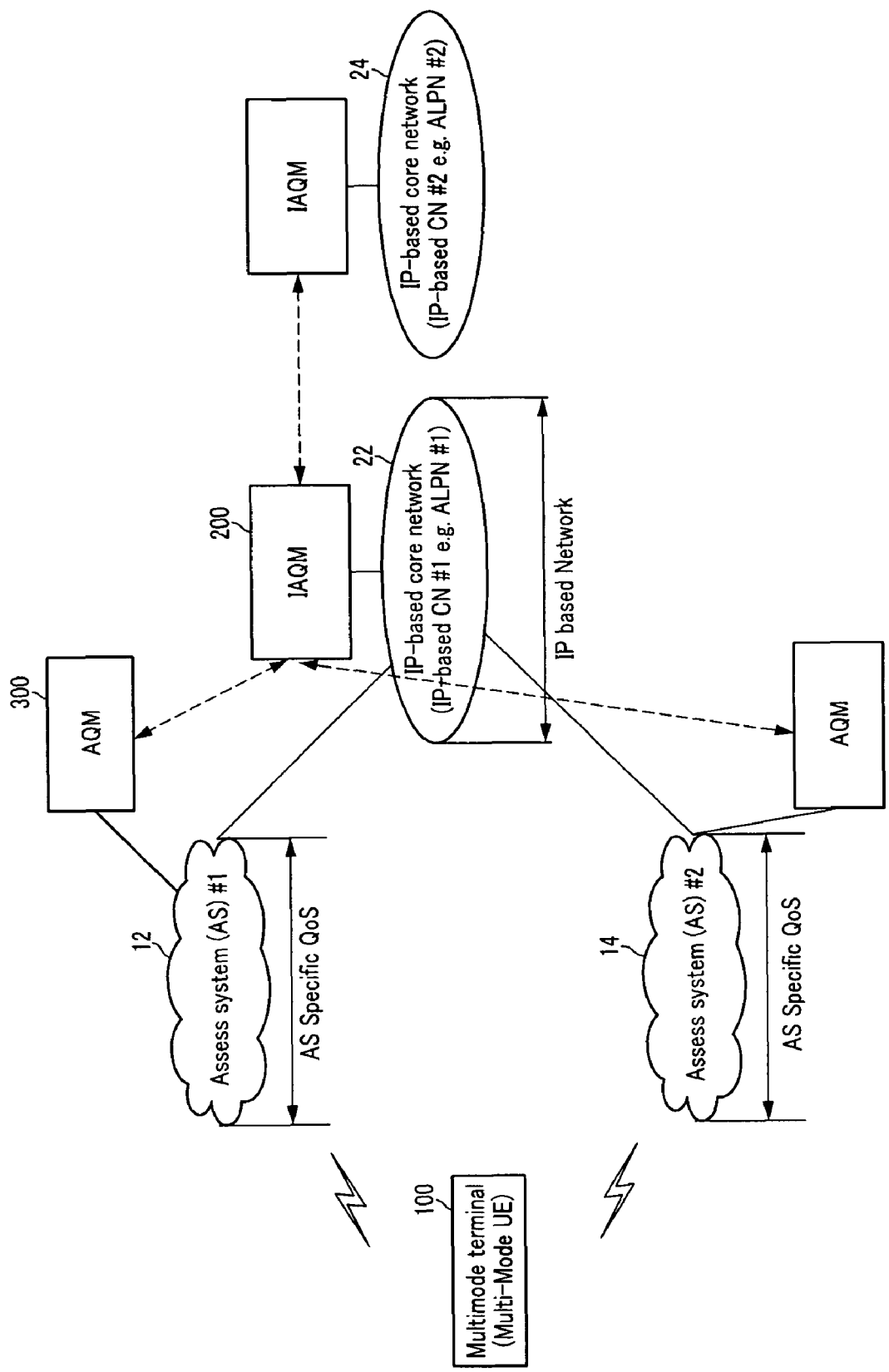
FIG. 1 shows a diagram representing a network configuration for providing a hand-off quality of service (QoS) between heterogeneous networks according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Unless explicitly described to the contrary, the word "comprise" or variations such as "comprises" or "comprising" will be understood to imply the inclusion of stated elements but not the exclusion of any other elements.

In addition, the word "module" will be understood to indicate a unit for processing a predetermined function or operation, which may be realized by hardware, software, or a combination thereof.

A device for providing a hand-off quality of service (QoS) between heterogeneous networks according to an exemplary embodiment of the present invention and a method thereof will be described with reference to the figures.

FIG. 1 shows a diagram representing a network configuration for providing a hand-off quality of service (QoS) between heterogeneous networks according to an exemplary embodiment of the present invention.

As shown in FIG. 1, a network includes a plurality of heterogeneous access systems 12 and 14 interworking with each other, and Internet protocol (IP)-based core networks 22 and 24 for providing an interworking operation to the access systems.

In this case, a specific QoS (AS Specific QoS) for each access system 12 and 14 is provided.

A multimode terminal 100 for supporting the multimode access systems 12 and 14 periodically detects the heterogeneous access system and performs a make-before-break hand-off between the heterogeneous access systems.

Here, a device for providing the hand-off QoS between heterogeneous networks in the above network includes an inter-system access QoS manager (IAQM) 200 for performing a QoS management function between the heterogeneous access systems 200 and an access system QoS service manager (AQM) 300 for performing the QoS management function for each access system.

The IAQM 200 for performing the QoS management function between the access systems 12 and 14 performs a QoS coordinator function in the core network 22 including the plurality of interworked access systems, and performs an interworking control operation between the plurality of AQMs 300.

In this case, the IAQM 200 is positioned at a back end of the access system to interwork with the respective access systems in an IP-based QoS control mechanism (DiffServ/IntServ).

The AQM 300 for managing the QoS of the corresponding access system performs wired and wireless QoS control functions in cooperation with a resource manager. That is, the access systems 12 and 14 are controlled by the AQM 300 in an individual QoS mechanism.

Configurations of the IAQM 200 and the AQM 300 will now be described with reference to FIG. 2 to FIG. 4 in further detail.

Figure 2:
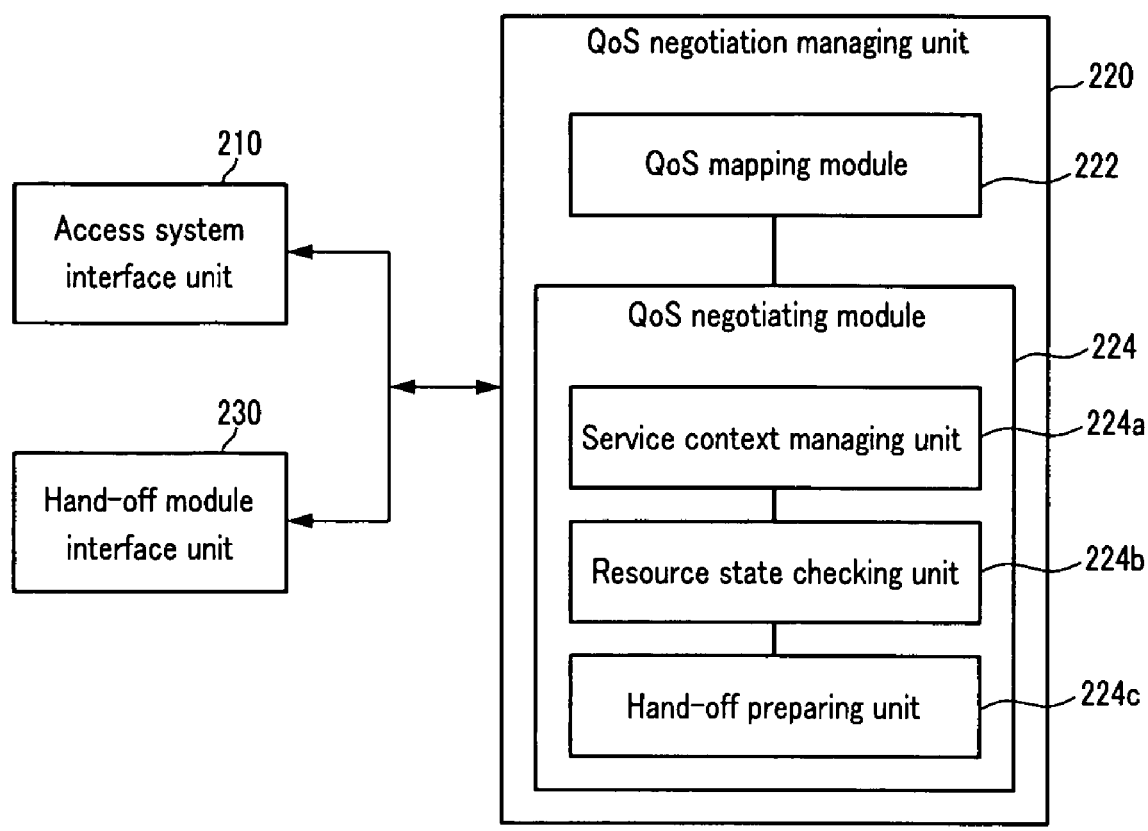
FIG. 2 shows a block diagram representing functions of a device for managing the QoS between access systems to provide the hand-off QoS between the heterogeneous networks according to the exemplary embodiment of the present invention.

FIG. 2 shows a block diagram representing functions of a device for managing the QoS between the access systems to provide the hand-off QoS between heterogeneous networks according to the exemplary embodiment of the present invention. That is, FIG. 2 shows a detailed function block diagram of the IAQM 200.

As shown in FIG. 2, the IAQM 200 includes an access system interface unit 210, a QoS negotiation managing unit 220, and a hand-off module interface unit 230.

The access system interface unit 210 performs an interface operation with the AQM 300. That is, the access system interface unit 210 requests a QoS context for negotiating the QoS to the AQM 300 of a serving access system of the multimode terminal 100 and receives the QoS context. In addition, the QoS negotiation managing unit 220 transmits the negotiated QoS negotiation information to the AQM 300 of a target access system of the multimode terminal.

The QoS negotiation managing unit 220 negotiates the QoS according to a hand-off request of the multimode terminal 100. In this case, the QoS negotiation managing unit 220 further includes a QoS mapping module 222 and a QoS negotiating module 224.

The QoS mapping module 222 uses the QoS context to perform a QoS mapping operation. In such a QoS mapping operation, a QoS parameter for each session is calculated based on information on a network congestion state, the QoS context, and a resource state of the target access system.

The QoS negotiating module 224 negotiates the QoS based on QoS information for each session of a service provided to the multimode terminal 100 by the AQM 300 of the serving access system. In addition, the QoS negotiating module 224 transmits a QoS negotiation result to the AQM 300 of the target access system of the multimode terminal 100 to prepare a preliminary operation for performing the hand-off.

In this case, the QoS negotiating module 224 further includes a service context managing unit 224a, a resource state checking unit 224b, and a hand-off preparing unit 224c.

The service context managing unit 224a requests the QoS context to the AQM 300 of the serving access system, and receives the QoS context. In this case, the QoS context includes user QoS subscription information and the QoS.

The resource state checking unit 224b requests resource state information to the AQM 300 of the target access system based on the QoS context, and received the resource state information.

The hand-off preparing unit 224c transmits a QoS mapping result to the AQM 300 of the target access system to prepare the hand-off.

The hand-off module interface unit 230 performs an interfacing operation with a vertical hand-off module (VHOM). That is, the hand-off module interface unit 230 receives a QoS negotiation request including the QoS information for each session according to the hand-off request from the multimode terminal 100. In addition, the hand-off module interface unit 230 transmits the QoS negotiation request to the QoS negotiation managing unit 220, and transmits a response including QoS information negotiated by the QoS negotiation managing unit 220.

Figure 3:
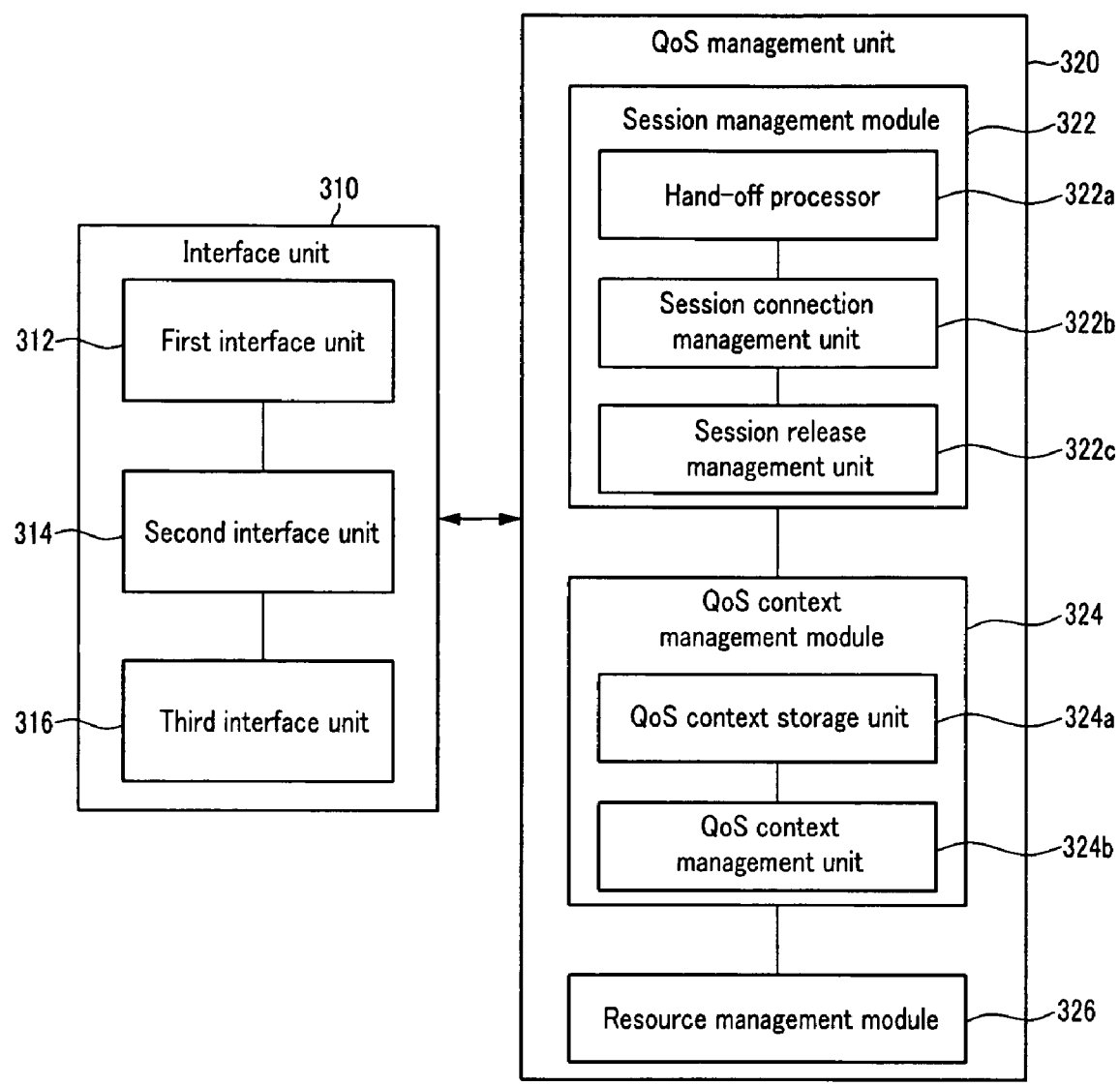
FIG. 3 shows a block diagram representing functions of a device for managing the QoS for each access system to provide the hand-off QoS between the heterogeneous networks according to the exemplary embodiment of the present invention.

FIG. 3 shows a block diagram representing functions of a device for managing the QoS for each access system to provide the hand-off QoS between the heterogeneous networks according to the exemplary embodiment of the present invention. That is, FIG. 3 shows a detailed function block diagram of the AQM 300.

As shown in FIG. 3, the AQM 300 includes an interface unit 310 and a QoS management unit 320.

The interface unit 310 performing an interface operation with the IAQM 200 receives a request of information for negotiating the hand-off QoS, and transmits a response to the request. In further detail, the interface unit 310 includes a first interface unit 312, a second interface unit 314, and a third interface unit 316.

The first interface unit 312 receives a resource state information request for negotiating the hand-off QoS, transmits a response to the request, receives a QoS negotiation result for preparing the hand-off, and transmits a response to the QoS negotiation result.

The second interface unit 314 receives a hand-off request from the multimode terminal 100, transmits the hand-off request to the vertical hand-off module (VHOM), and receives a hand-off response including the negotiated QoS.

The third interface unit 316 receives the hand-off request from the multimode terminal 100, transmits a response to the hand-off request, and provides a service to the multimode terminal 100.

The QoS management unit 320 manages a service session of the multimode terminal 100 and the QoS information, and provides information requested by the IAQM 200 in cooperation with the interface unit 310.

In further detail, the QoS management unit 320 includes a session management module 322, a QoS context management module 324, and a resource management module 326.

The session management module 322 manages a user service session and the QoS of the access system. In this case, the session management module 322 includes a hand-off processor 322a, a session connection management unit 322b, and a session release management unit 322c.

The hand-off processor 322a performs a preliminary operation for the hand-off according to the QoS negotiation result received from the IAQM 200.

The session connection management unit 322b performs a service session connection to the multimode terminal 100 by using the QoS negotiation information.

The session release management unit 322c releases a service session according to the hand-off of the multimode terminal 100.

The QoS context management module 324 manages QoS-related subscription information and the QoS information. In this case, the QoS context management module 324 includes a QoS context storage unit 324a and a QoS context management unit 324b.

The QoS context storage unit 324a stores the QoS-related subscription information and the QoS information.

The QoS context management unit 324b extracts corresponding information from the QoS context storage unit 324a according to the request from the IAQM 200 and provides the information.

The resource management module 326 provides the resource state information according to the request from the IAQM 200 in cooperation with a resource management unit 330 for managing resource allocation of the access systems 12 and 14.

Figure 4:
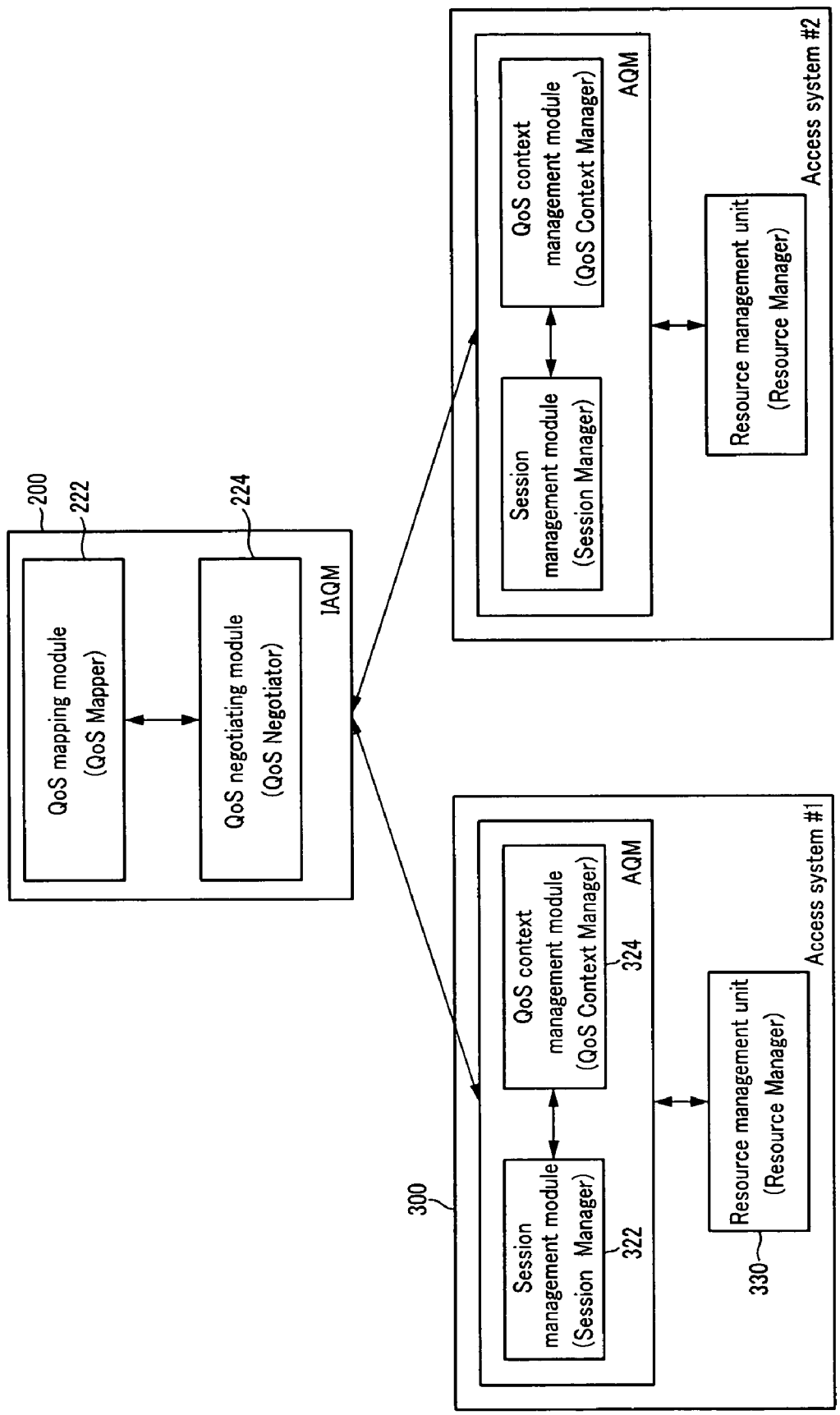
FIG. 4 shows a hierarchical configuration of the device for providing the hand-off QoS between the heterogeneous networks according to the exemplary embodiment of the present invention.

FIG. 4 shows a hierarchical configuration of the device for providing the hand-off QoS between heterogeneous networks according to the exemplary embodiment of the present invention.

As shown in FIG. 4, the IAQM 200 has a hierarchical relationship with the AQMs 300 of the plurality of interworked access systems 12 and 14. In this case, the IAQM 200 may be interworked with the AQMs 300 of the plurality of interworked access systems, and other IAQMs 200.

Figure 5:
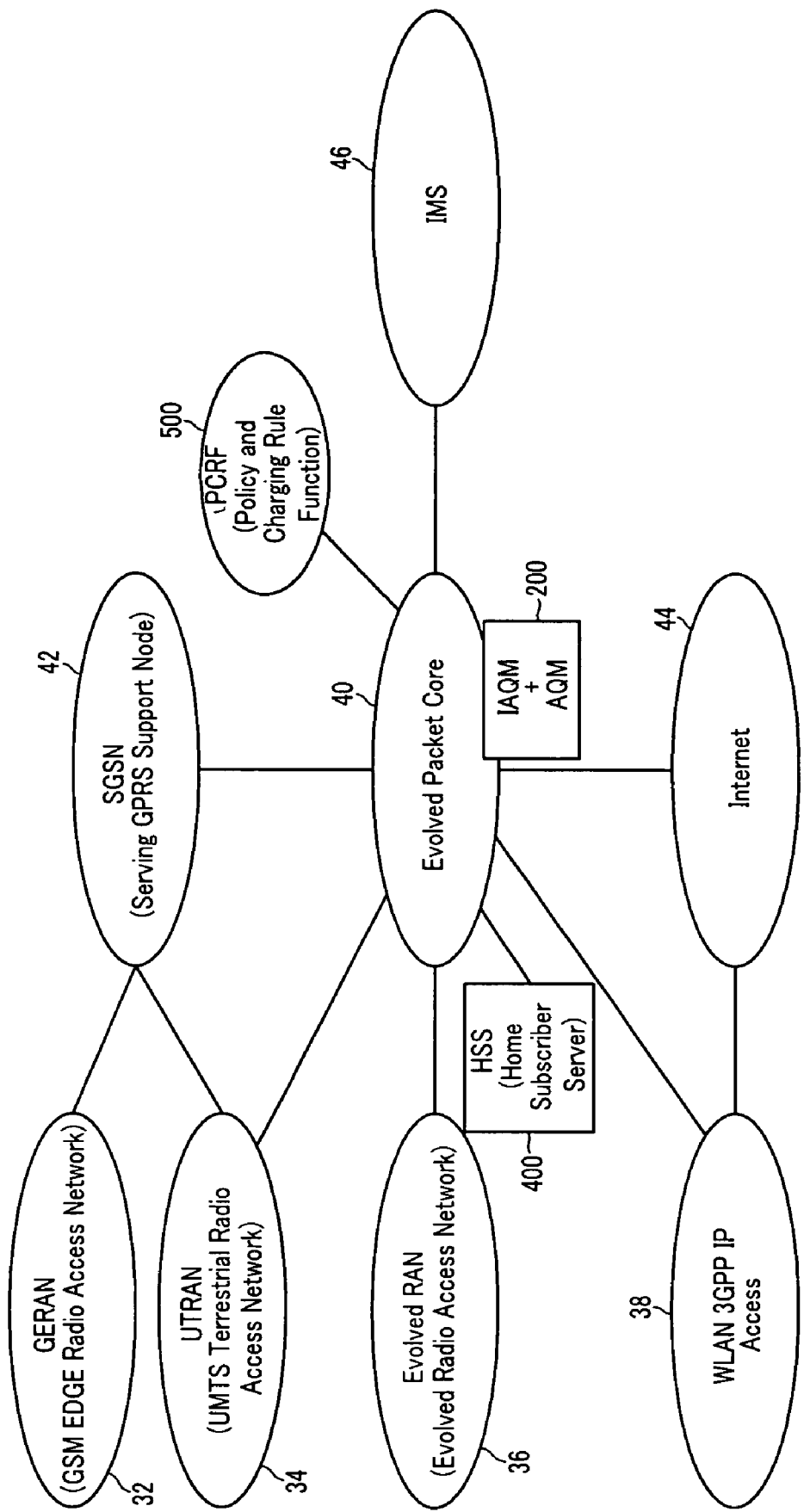
FIG. 5 shows a network configuration in which a device for providing the hand-off QoS between the heterogeneous networks according to a first exemplary embodiment of the present invention is applied to a configuration (concept 1) of a 3G evolution system proposed by the $3^{rd}$ generation partnership project (3GPP) standard association (SA) working group 2 (WG2).

FIG. 5 schematically shows a network configuration in which a device for providing the hand-off QoS between the heterogeneous networks according to a first exemplary embodiment of the present invention is applied to a configuration (concept 1) of a 3G evolution system proposed by the $3^{rd}$ generation partnership project (3GPP) standard association (SA) working group 2 (WG2).

In FIG. 5, a network has a configuration of a 3GPP Evolution system using an evolved packet core 40, and an interwork configuration thereof.

That is, a packet service (PS)-core of a universal mobile telecommunications system (UMTS) is evolved to be used as a core network of the 3G Evolution system. In addition, an evolved radio access network (RAN) 36 using a new access technology, and a serving general packet radio service (GPRS) support node (SGSN) and a wireless local area network (WLAN) 3GPP Internet protocol (IP) access 38 of an existing 3GPP Release6 system, interwork with the evolved packet core 40. In this case, the 3GPP Release6 system includes a global system for mobile communications (GSM) enhanced data GSM environment (EDGE) radio access network (GERAN) 32 and a universal mobile telecommunications system (UTMS) terrestrial radio access network (UT-RAN) 34.

The evolved packet core 40 extends a function of a core network of an existing 3GPP GPRS system to perform a function for processing packet data.

In addition, the evolved packet core 40 interworks with a home subscriber server (HSS) 400 for storing user information and a policy and charging rule function (PCRF) 500 for performing policy and accounting functions.

Further, the evolved packet core 40 may interwork with a call session control function (CSCF) on an Internet multimedia subsystem (IMS) 46 so as to manage session initiation protocol (SIP)/session description protocol (SDP)-based service sessions. Here, a packet switched streaming service (PSS) may be substituted for the IMS as an Op. IP Serv network.

In such a 3G Evolution system, the device 200 for providing the hand-off QoS between the heterogeneous access systems is positioned in the evolved packet core 40 to perform the QoS management function between the heterogeneous access systems and the QoS management function for each access system.

In this case, since the IAQM in the evolved packet core 40 performs a function of the GGSN of the existing UMTS system and a function of the core network of the 3G evolution system, the device 200 includes the IAQM and the AQM. That is, the IAQM and AQM functions are formed in an integrated device. The IMS on a network of a service provider is used to perform the SIP/SDP protocol process for controlling the user service session, and the PCRF is used to perform authentication, accounting, and policy functions for the session.

A configuration of the device 200 is not illustrated, but, referring to FIG. 2 and FIG. 3, the device 200 may include a first QoS management unit corresponding to the AQM 300 and a second QoS management unit corresponding to the IAQM 200.

In this case, the first QoS management unit performs a local QoS management function for each access system. In further detail, the local QoS management function may be realized by the session management module and the QoS context management module.

The session management module manages the user service session and the local QoS.

The QoS context management module service session manages QoS-related information.

The second QoS management unit performs the QoS management function according to the hand-off between the heterogeneous access systems, which may be realized by the QoS negotiating module and the QoS mapping module in further detail.

The QoS negotiating module performs the service session QoS negotiation and the service context management for the hand-off between the heterogeneous access systems.

The QoS mapping module performs the QoS mapping operation according to the hand-off between the heterogeneous access systems.

Figure 6:
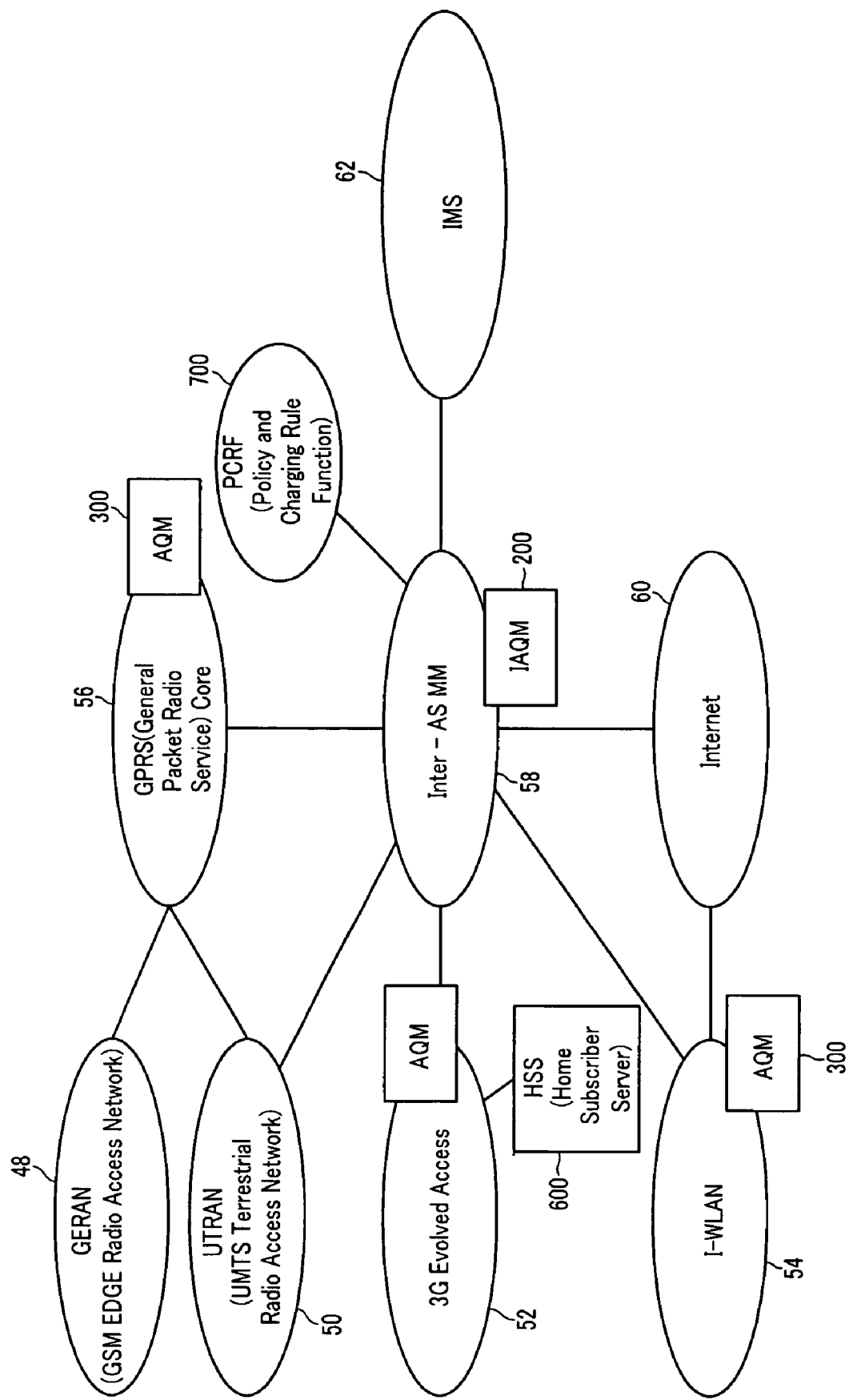
FIG. 6 shows a network configuration in which a device for providing the hand-off QoS between the heterogeneous networks according to a second exemplary embodiment of the present invention is applied to a configuration (concept 2) of a 3G evolution system proposed by the $3^{rd}$ generation partnership project (3GPP) standard association (SA) working group 2 (WG2).

FIG. 6 shows a network configuration in which a device for providing the hand-off QoS between the heterogeneous networks according to a second exemplary embodiment of the present invention is applied to a configuration (concept 2) of a 3G evolution system proposed by the $3^{rd}$ generation partnership project (3GPP) standard association (SA) working group 2 (WG2).

As shown in FIG. 6, the network maintains the functions of the existing access system and mobile communication system, and an inter-access system mobility management (Inter-AS MM) unit 58 is used to perform the interworking operation of the access systems. In this case, the Inter-AS MM 58 uses the PCRF 700 to perform the authentication, accounting, and policy functions for the session. In addition, the Inter-AS MM 58 may interwork with the IMS 62 as the Op. IP Serv network.

In the above configuration, UMTS GPRS systems 48, 50, and 56 proposed by the 3GPP, the 3G evolved access system 52 to be standardized, and an intelligent WLAN (I-WLAN) system 54 are respectively formed as individual access systems, and they interwork through the Inter-AS MM 58.

The 3G UMTS GPRS systems 48, 50, and 56 operate as a single individual access system, and the GPRS function includes the AQM 300 for performing the QoS management function of the access system.

In addition, the 3G evolved access system 52 and the I-WLAN 54 respectively include the AQM 300, and the AQM performs the QoS management function for each access system.

To perform the interworking operation between the plurality of access systems, the Inter-AS MM 58 includes the IAQM 200, and the IAQM 200 performs the QoS mapping and QoS negotiation function between the heterogeneous access systems.

Figure 7:
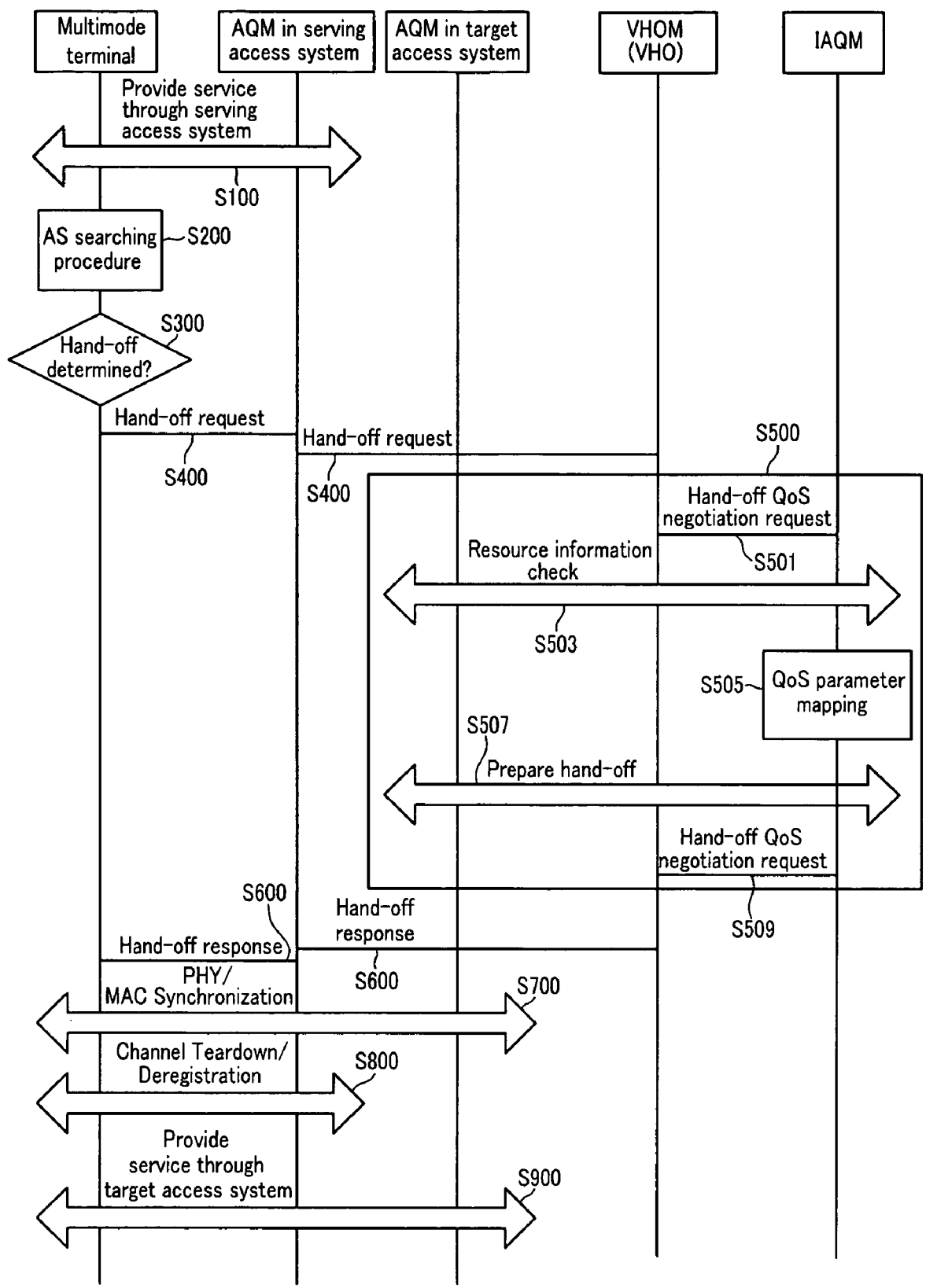
FIG. 7 shows a flowchart representing processes for providing the hand-off QoS between heterogeneous networks according to the exemplary embodiment of the present invention.

FIG. 7 shows a flowchart representing processes for providing the hand-off QoS between heterogeneous networks according to the exemplary embodiment of the present invention. That is, it shows a flowchart of operations of the IAQM 200 and the AQM 300 for providing service continuity when the hand-off is performed between the heterogeneous access systems.

As shown in FIG. 7, the multimode terminal 100 receives a service through a serving access system in step S100.

Subsequently, the multimode terminal 100 searches a heterogeneous access system in step S200. In this case, information on neighboring access systems may be provided by using periodical system information of an access system that is providing a service. In addition, the heterogeneous access system is acknowledged by a periodical access system searching process or the received system information.

Then, a hand-off to the heterogeneous access system is determined in step S300 by using information on the searched access system. The above hand-off is referred to as a vertical hand-off.

A hand-off request message is transmitted to the evolved packet core or a hand-off module (VHOM) of the Inter-AS MM in step S400. In this case, a transmission parameter may include information on the searched access system and current service QoS parameter information.

For a service session receiving a service from the service access system, a QoS negotiation request message is transmitted to the IAQM in step S501. In this case, the transmission parameter may include the QoS information for each session.

A resource state of a target access system for the hand-off is checked in step S503. In further detail, QoS context of a user requesting the hand-off is requested and received from the serving access system, and resource state information based on the QoS context is requested and received from the target access system.

QoS negotiation and mapping operations are performed in step S505 by using the QoS context and resource state information. In further detail, service characteristics for each session are guaranteed, and a QoS parameter for the service continuity is generated by using a network congestion state, user QoS subscription information, the QoS information, and a resource allocation state of the target access system.

When the step S505 is successfully performed, a preliminary operation is performed to prepare a service session of a terminal to be moved to the target access system, in step S507. That is, a QoS negotiation result is provided to the AQM 300 of the target access system so that the AQM prepares the preliminary operation for the hand-off. In further detail, the preliminary operation may include a process of request and allocation of a commission address CoA, and an authorization/authentication process when using a Mobile IPv4.

For the service session, a response to the QoS negotiation request message is transmitted to the hand-off module (VHOM) in step S509. In this case, the transmission parameter includes a QoS profile negotiated for the requested session.

Subsequently, the hand-off module (VHOM) transmits a hand-off response in step S600. In this case, the transmission parameter includes negotiated QoS parameter information.

Then, the multimode terminal 100 performs physical layer (PHY)/media access control (MAC) synchronization and registration processes with the target access system in step S700.

The multimode terminal 100 performs channel cancellation and registration cancellation processes with the serving access system in step S800. In this case, service traffic that has not been transmitted is forwarded to the target access system.

The target access system provides a service including the service traffic that has not been transmitted, in step S900.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, according to the exemplary embodiment of the present invention, quality of an ongoing service is guaranteed, and a hand-off delay is prevented when the hand-off is performed between the heterogeneous systems.

What is claimed is:

1. An apparatus for managing a quality of service (QoS) of a vertical hand-off operation of heterogeneous access systems, the apparatus comprising:
    a QoS negotiation managing unit for negotiating the QoS according to a vertical hand-off request between a serving access system and a target access system of a terminal, wherein the serving access system and the target access system are heterogeneous access systems and the hand-off request is a request for a vertical hand-off for transferring the connection between the terminal and the serving access system to between the terminal and the target access system in order to provide a service provided from the serving access system through the target access system; and
    an access system interface unit for requesting a QoS context for negotiating the QoS from the serving access system of the terminal in order to receive the requested QoS context, the QoS context being associated with QoS for the connection between the terminal and the serving access system established prior to the vertical hand-off, and for transmitting QoS information negotiated by the QoS negotiation managing unit to the target access system of the terminal for the connection transferred to between the terminal and the target access system.

2. The apparatus of claim 1, wherein the QoS negotiation managing unit comprises:
    a QoS mapping module for performing a QoS mapping operation by using the QoS context; and
    a QoS negotiating module for negotiating the QoS based on session QoS information of a service that is provided to the terminal from the serving access system, and transmitting a QoS negotiation result to the target access system of the terminal to prepare the vertical hand-off.

3. The apparatus of claim 2, wherein the QoS negotiation module comprises:
    a service context managing unit for requesting the QoS context from the serving access system to receive the QoS context;
    a resource state checking unit for requesting from the target access system resource state information of the target access system based on the QoS context in order to receive the requested resource state information of the target access system; and
    a hand-off preparing unit for transmitting the QoS negotiation result to the target access system to prepare the vertical hand-off between the serving access system and the target access system.

4. The apparatus of claim 1, wherein the QoS context comprises QoS-related subscription information of a terminal user, and QoS information.

5. The apparatus of claim 4, wherein the QoS mapping module generates a QoS parameter for each session based on a network congestion state, the QoS context, and the resource state information of the target access system.

6. The apparatus of claim 5, further comprising a hand-off module interface unit for receiving a QoS negotiation request including the session QoS information, transmitting the QoS negotiation request to the QoS negotiation managing unit, and transmitting a QoS negotiation response including the QoS negotiation information, according to the hand-off request of the terminal.

7. An apparatus for managing a quality of service (QoS) for an individual access system of a plurality of heterogeneous access systems including a serving access system and a target access system in cooperation with a device for managing the QoS of a vertical hand-off for transferring the connection between a terminal and the serving access system to between the terminal and the target access system in order to provide the service provided from the serving access system through the target access system, the apparatus comprising:
    an interface unit for performing an interface operation with the device for managing the QoS of a vertical hand-off operation between the heterogeneous access systems including the serving access system and the target access system, receiving a request for information for negotiating a vertical hand-off QoS, and transmitting a response to the request; and
    a QoS controller for managing a service session and QoS information, interworking with the interface unit, and providing information requested by the device for managing the QoS of a vertical hand-off between the heterogeneous access systems including the serving access system and the target access system, the QoS information managed by the QoS controller being associated with QoS for the connection between the terminal and the serving access system established prior to the vertical hand-off.

8. The apparatus of claim 7, wherein the QoS controller comprises:
    a session management module for managing a user service session and the QoS of the access system;
    a QoS context management module for managing QoS-related subscription information and the QoS information; and a resource management module for providing resource state information according to a request from the device for managing the QoS between the heterogeneous access systems by interworking with a resource management unit for managing resource allocation of the access system.

9. The apparatus of claim 8, wherein the session management module comprises:
a hand-off processor for performing a preliminary operation for the hand-off according to a QoS negotiation result received from the device for managing the QoS between the heterogeneous access systems;
a session connection management unit for performing a service session connection to the terminal by using the QoS negotiation result; and
a session release management unit for releasing a service session from the terminal according to the hand-off.

10. The apparatus of claim 8, wherein the QoS context management module comprises:
a QoS context storage unit for storing the QoS-related subscription information and the QoS information; and
a QoS context management unit for extracting corresponding information from the QoS context storage unit according to a request from the device for managing the QoS between the heterogeneous access systems.

11. The apparatus of claim 7, wherein the interface unit comprises:
a first interface unit for receiving a resource state information request for negotiating the hand-off QoS, transmitting a response to the request, receiving a negotiation result for the QoS for preparing the vertical hand-off, and transmitting a response to the negotiation result;
a second interface unit for receiving a hand-off response including a negotiated QoS for the vertical hand-off request received from the terminal; and
a third interface unit for receiving the vertical hand-off request from the terminal, transmitting the hand-off response including the negotiated QoS, and providing a service to the terminal.

12. An apparatus for providing a vertical hand-off quality of service (QoS) between heterogeneous access systems including a serving access system and a target access system in a network having a plurality of interworked access systems, the apparatus comprising:
a first QoS management unit for performing a local QoS management function for each access system; and
a second QoS management unit for performing a QoS management function according to a vertical hand-off between the serving access system and the target access system for transferring the connection from the serving access system to the target access system in order to provide the service provided from the serving access system through the target access system, the second QoS management unit performing the QoS management function according to the vertical hand-off using information requested and obtained from the first QoS management unit performing the local QoS management function.

13. The apparatus of claim 12, wherein the first QoS management unit comprises:
a session management module for managing a user service session and a local QoS; and
a QoS context management module for managing QoS-related information of the service session.

14. The apparatus of claim 12, wherein the session QoS management unit comprises:

a QoS negotiation module for negotiating the QoS of a service session for the vertical hand-off between the serving access system and the target access system and managing a service context; and
a QoS mapping module for performing a QoS mapping operation according to the vertical hand-off between the serving access system and the target access system.

15. A method for managing a quality of service (QoS) of a vertical hand-off operation of heterogeneous access systems, comprising:
a) receiving a QoS negotiation request for a vertical hand-off between heterogeneous access systems for transferring the connection between a terminal and a serving access system to between the terminal and a target access system in order to provide a service provided from the serving access system through the target access system;
b) requesting for user information and access system information for negotiating a hand-off QoS from the serving access system and the target access system, and receiving the information, the information including information associated with QoS for the connection between the terminal and the serving access system established prior to the vertical hand-off;
c) negotiating the QoS of the vertical hand-off operation by using the information received in b); and
d) providing a QoS negotiation result to the target access system for the connection transferred to between the terminal and the target access system.

16. The method of claim 15, wherein b) comprises:
i) requesting QoS information of a user requesting the vertical hand-off, from the serving access system, and receiving the QoS information; and
ii) requesting resource state information from the target access system based on the received QoS information, and receiving the resource state information.

17. The method of claim 16, wherein, in c), a QoS mapping operation between the access systems is performed by using the user QoS information and the resource state information.

18. The method of claim 15, wherein d) comprises:
i) transmitting a QoS negotiation result to the target access system to prepare the vertical hand-off according to the QoS negotiation; and
ii) providing a profile of the negotiated QoS to perform the vertical hand-off between the access systems.

19. The method of claim 18, wherein, in a), the QoS negotiation request having QoS information for each session is received.

20. A method for providing a quality of service (QoS) for each access system in order to perform a vertical hand-off between heterogeneous access systems for transferring the connection between a terminal and the serving access system to between the terminal and a target access system in order to provide the service provided from the serving access system through the target access system, the method comprising:
a) transmitting a QoS negotiation request for a vertical hand-off operation according to a vertical hand-off request from the terminal, by a serving access system;
b) transmitting user information according to a user information request for negotiating the QoS, the user information including information associated with QoS for the connection between the terminal and the serving access system established prior to the vertical hand-off;
c) receiving a vertical hand-off response according to a QoS negotiation based on the information transmitted in b); and d) performing a service session release according to the vertical hand-off response.

21. The method of claim 20, wherein, in b), QoS-related user subscription information and QoS information requests for negotiating the QoS according to the QoS negotiation request are received, and provided.

22. The method of claim 20, wherein a) comprises:
receiving a vertical hand-off request determined according to a terminal access system search process;
extracting information for searching an access system neighboring the terminal, and QoS parameter information of a service provided to the terminal; and
transmitting a QoS negotiation request including the extracted information according to the vertical hand-off request.

23. The method of claim 22, wherein b) comprises:
i) performing a channel cancellation and a registration cancellation of a service session connected to the terminal; and
ii) forwarding service traffic that has not been transmitted to the target access system to which the terminal performs a hand-off request.

24. A method for managing a quality of service (QoS) for each access system in order to perform a vertical hand-off between heterogeneous access systems for transferring the connection between the terminal and a serving access system to between the terminal and a target access system in order to provide a service provided from the serving access system through the target access system, the method comprising:
a) receiving an access system information request for negotiating a vertical hand-off QoS, and providing access system information, by the target access system;
b) receiving a hand-off QoS negotiation result obtained using QoS context associated with QoS for the connection between the terminal and the serving access system established prior to the vertical hand-off, and performing a preliminary operation for the vertical hand-off; and
c) connecting a service session between the terminal and the target access system by using the vertical hand-off QoS negotiation result, and providing the service provided from the serving access system through the target access system.

25. The method of claim 24, wherein a) comprises:
i) receiving a resource state information request for negotiating the QoS; and
ii) determining whether a resource is allocated, based on user QoS-related subscription information and the QoS information in the resource state information request; and
iii) adding information determined in ii) to a response according to the resource state information request, and transmitting the response.

26. The method of claim 24, wherein, in b), processes including an address allocation process and an authentication process are performed to perform a service session connection according to the vertical hand-off.

27. The method of claim 26, wherein c) comprises:
i) performing the service session connection to the terminal; and
ii) adding service traffic that has not been transmitted and received from a serving access system of the terminal, and providing a service using the QoS negotiation result.

* * * * *